United States Patent [19]

Magnier

[11] Patent Number: 4,673,663

[45] Date of Patent: Jun. 16, 1987

[54] CATALYST SUPPORT AND PROCESS FOR PREPARING SAME

[75] Inventor: Claude Magnier, Paris, France

[73] Assignee: Rhone-Poulenc Specialites Chimiques, Courbevoie, France

[21] Appl. No.: 591,054

[22] Filed: Mar. 19, 1984

Related U.S. Application Data

[63] Continuation of Ser. No. 452,089, Dec. 22, 1982, abandoned.

[30] Foreign Application Priority Data

Jun. 22, 1981 [FR] France .................................. 81 12187

[51] Int. Cl.$^4$ ............................................. B01J 23/26
[52] U.S. Cl. ................................... 502/320; 502/210; 502/315; 502/316; 502/335; 502/337; 502/338; 502/355; 502/439; 502/527; 423/213.2; 204/38.5
[58] Field of Search ............... 502/527, 332, 335, 336, 502/337, 338, 355, 315, 319, 320, 305, 210; 204/38 C, 38 R, 41; 423/213.2

[56] References Cited

U.S. PATENT DOCUMENTS

| | | | |
|---|---|---|---|
| 3,891,575 | 6/1975 | Bräutigam et al. | 502/261 |
| 3,907,708 | 9/1975 | Lacroix | 502/320 |
| 3,923,696 | 12/1975 | Chart et al. | 502/307 |
| 3,928,235 | 12/1975 | Goodell | 423/213.2 |
| 3,978,193 | 8/1976 | Fedor et al. | 423/213.7 |
| 4,046,712 | 9/1977 | Cairns et al. | 502/5 |
| 4,096,095 | 6/1978 | Cairns | 423/213.5 |
| 4,196,099 | 4/1980 | Hunter et al. | 502/210 |
| 4,252,690 | 2/1981 | Kamiya et al. | 502/527 |
| 4,271,044 | 6/1981 | Fratzer et al. | 502/527 |
| 4,279,782 | 7/1981 | Chapman et al. | 502/527 |
| 4,289,652 | 9/1981 | Hunter et al. | 502/210 |
| 4,318,828 | 3/1982 | Chapman | 502/527 |
| 4,402,662 | 9/1983 | Pfefferle | 502/527 |
| 4,414,023 | 11/1983 | Aggen et al. | 582/439 |
| 4,451,517 | 5/1984 | Inoguchi et al. | 502/527 |
| 4,500,650 | 2/1985 | Wyatt et al. | 423/213.2 |
| 4,514,520 | 4/1985 | Uytterhoeven et al. | 502/527 |

*Primary Examiner*—Andrew H. Metz
*Assistant Examiner*—Anthony McFarlane
*Attorney, Agent, or Firm*—Burns, Doane, Swecker & Mathis

[57] ABSTRACT

A catalyst support and process for preparing same are provided wherein a metal substrate is coated with a layer of adherent alumina with a layer of chromium interposed between the alumina catalyst support and the metal substrate. The catalyst supports of the invention are especially useful in catalytic converters for the purification and control of exhaust gas emissions from internal combustion engines by the active catalyst oxidation/reduction of carbon monoxide, unburned hydrocarbons and nitrogen oxides.

20 Claims, No Drawings

CATALYST SUPPORT AND PROCESS FOR PREPARING SAME

This application is a continuation application of co-pending U.S. application Ser. No. 452,089, filed Dec. 22, 1982, now abandoned.

BACKGROUND OF THE INVENTION

The present invention relates to a catalyst support and, in particular, to such catalyst supports especially for use in catalytic systems for the treatment of exhaust gases from internal combustion engines and to an advantageous process for the preparation of such supports.

Catalyst supports and, in particular, post-combustion catalyst supports in the manufacture of catalytic converters for internal combustion engines generally comprise mineral oxides in agglomerated form or deposited on either ceramic or metallic substrates. Metal substrates are generally preferred as a consequence of their greater mechanical strength. Moreover, for catalysts deposited on substrates, in view of the high temperatures at which same operate, i.e., on the order of 1000° C., in conventional practice it has been preferred to use steel substrates, especially stainless and high temperature steel substrates. Conventionally, for example, such high temperature steel substrates include nickel and chromium steel.

The deposition of an acceptable support, especially alumina support, on such metallic substrates has been difficult to accomplish in the past. The difficulties encountered to date are due to the absence of sufficient microporosity in the substrate to permit the relatively permanent attachment of the support and further to the lack of chemical affinity between the support and the substrate.

Numerous processes have heretofore been proposed to overcome these problems.

For example, one previously proposed process comprises forming the alumina in situ by the oxidation of alloys containing aluminum. The disadvantage of this process is that such alloys are very expensive.

It has been further proposed to deposit the alumina in the form of a $Al_2O_3 + Al(H_2PO_4)_3$ mixture. However, this process can be used effectively only on certain types of steel, specifically non-stainless steels, as the nickel component thereof interferes with the phosphatation.

SUMMARY OF THE INVENTION

It is thus a major object of the invention to provide a catalyst support on a metal substrate in which the adherence of the support to the substrate is excellent.

The catalyst support of the present invention is of the type comprising a metal substrate and a layer of alumina deposited thereon, wherein excellent support-substrate adherence is achieved by providing a layer of chromium between the substrate and the alumina layer.

DETAILED DESCRIPTION OF THE INVENTION

According to the invention, the process for the preparation of the aforementioned catalyst support on a metal substrate (e.g., stainless steel) comprises depositing a first layer of chromium on said substrate and, thereafter, depositing a second layer of alumina on the chromium layer.

In accordance with the process of the invention, the resulting alumina layer of the catalyst support of the invention resists separation or degradation especially well, even if the metal substrate is bent or otherwise worked in ultimately forming the catalytic converter.

Other characteristics and advantages of the invention will become more apparent from the description and the actual but non-limiting examples hereinafter.

In the preferred embodiments of the invention, the substrate of the catalyst is comprised of steel. Of course, various types of steel may be used without departing from the scope of the invention. The choice of steel will be a function of the conditions in which the catalyst is used. In particular, for post-combustion (i.e., exhaust gas) catalysts, steels such as stainless and high temperature steels capable of withstanding elevated temperatures and the severe conditions encountered in the gas exhaust systems of vehicles, are used.

Thus, steels containing about 16 to 30% by weight chromium; 18 to 25% nickel and optionally with trace amounts of molybdenum, titanium and/or niobium, may be employed.

According to a particular preferred embodiment of the invention, a stainless and heat resisting steel with 25% by weight chromium and 13% by weight nickel is used as the substrate. This type of steel is especially advantageous by reason of its good mechanical and high temperature strengths.

The substrate may advantageously be in monolithic form. In particular, the substrate may be deformed mechanically by extrusion, rolling, etc., so as to present an increased specific surface area compared with that of a nondeformed substrate for the same unit volume. The monolith may thus be deformed so as to present, for example, an undulated surface; it will then be wound helically to form a tube which may be integrally connected to the exhaust manifold pipe/muffler.

The chromium layer deposited on the substrate will have a thickness of approximately several microns, and, preferably, one micron.

The alumina layer generally will have a thickness of approximately several tens of microns, preferably 10 to 30 microns.

Any type of alumina with properties suitable for a catalyst support may be used. Thus, according to a particular embodiment of the invention, an alumina fibrillar boehmite with a specific surface greater than 200 $m^2/g$ is used. An alumina of the gibbsite type may also be utilized.

The process for preparing the catalyst support is described in more detail hereinbelow.

Initially, the substrate is pickled, specifically with a chloro-sulfuric acid mixture.

The substrate treated in this manner is then chromized. Chromizing is effected preferably under conditions such that a "mat" chromized surface is obtained, which is relatively heterogeneous. Chromizing may be performed electrolytically by passage through a chromizing bath of conventional composition, based on chromic acid and sulfuric acid and it may contain one or more of the usual additives in such chromizing baths. The duration of the chromizing process varies as a function of the thickness of the chromium layer to be deposited. As mentioned hereinabove, the chromium layer will advantageously be several microns thick.

Chromizing may also be effected continuously. After chromizing, the monolith is calandered and optionally corrugated.

After chromizing, the monolith is subsequently impregnated with alumina.

The deposition of the alumina may be effected in several different ways. For example, the chromed monolith may be immersed in an alumina dispersion or the alumina dispersion may be atomized onto the heated monolith. The dispersions will generally comprise 5% to 15% by weight alumina possibly containing, in the case of the aforementioned immersion process, an amount of a surface active agent between about 0.5% to 3%, and, preferably, about 1% by weight. The surface active agent functions to facilitate the subsequent drying of the alumina and to prevent its separation from the substrate. It may consist, for example, of a heavy alcohol of the "CEMULSOL" type.

It should be noted that prior to the deposition of the alumina on the chromized surface, it is desirable to depassivate the latter. In effect, after chromizing, oxidation takes place at the level of the chromium layer and this oxidation may have a very detrimental effect in regard to the adhesion of the alumina to the substrate.

Depassivation may be effected, for example, by means of a hydrochloric acid treatment. This treatment may be performed by immersion in a normal hydrochloric acid solution for several seconds at 90° C.

Even though it would be of less interest in an industrial operation, it is possible to prevent oxidation by the deposition of a water soluble gum onto the chromized substrate. This layer is removed by the water present in the aqueous dispersion of alumina during the deposition of the aluminum layer.

Following the deposition of the alumina by immersion, the catalyst support is dried in air, then in an oven, for example at around 110° C.

After drying, or after the aforementioned atomization, the catalyst support is calcined at a temperature of approximately 600° C.

In this manner, a catalyst support with excellent adhesion to the substrate is obtained.

The support thus obtained may then be impregnated with the active catalyst itself, for example, platinum or palladium. It should be noted that it is possible to deposit the active catalyst simultaneously with the alumina, by applying a solution or dispersion of alumina and, for instance, platinum (e.g. chloroplatinic acid) under conditions similar to those described hereinabove.

In order to further illustrate the present invention and the advantages thereof, the following specific examples are given, it being understood that same are intended only as illustrative and in nowise limitative.

EXAMPLE 1

A plate of stainless and heat resistant steel (Cr 25%, Ni 13% by weight) is immersed in a chromizing bath containing 45 g/l chromic acid and 4.5 g/l sulfuric acid at 31° C. and for 4 minutes, under a current density of 20 A/dm$^2$. A layer of chromium several microns in thickness is thereby deposited. The plate is subsequently protected against oxidation by applying a layer of a water soluble gum.

A 12% by weight dispersion of a very fine alumina (fibrillar boehmite with a specific surface greater than 200 m$^2$/g) is then atomized onto the plate heated to 140° C.

The plate is subsequently calcined at 600° C. A layer of alumina approximately 10$\mu$ thick which resists separation even during bending and is suitable for impregnation with active catalysts for the treatment of internal combustion engine exhaust gases, is thus deposited.

EXAMPLE 2

This example illustrates a variant of the invention wherein the plate is exposed to phosphatation after chromizing, with the aid of an aqueous dispersion of monoaluminum phosphate. The alumina may then be deposited without problems onto the phosphate layer, in particular by the abovedescribed processes, as these materials have a strong chemical affinity for the metal substrate.

A plate, of the type described in Example 1, is chromized under the same conditions and then protected by a layer of gum. The plate is subsequently immersed for 2 h at 90° C. in a 50% by weight dispersion of Al(H$_2$PO$_4$)$_3$.

A 12% aluminum dispersion is then atomized onto the plate heated to 140° C., the alumina being of the type of Example 1.

The plate is calcined at 600° C.

A layer of approximately 15$\mu$ is thereby deposited.

EXAMPLE 3

This example illustrates another variant of the invention similar to that of Example 2, wherein the monoaluminum phosphate is converted into aluminum polyphosphate prior to depositing the alumina layer.

A plate of the same type as in Example 2 is used and the process is effected in the same manner as before described until the immersion in the Al(H$_2$PO$_4$)$_3$ solution.

After this immersion, the plate is calcined at 600° C. to form [Al(PO$_3$)$_3$]$_n$.

A solution of 12% of alumina of the type of Example 1 is then atomized onto the plate heated to 140° C.

The plate is subsequently calcined at 600° C.

A layer of alumina with an approximate thickness of 10$\mu$ is thus deposited.

The catalyst support of the invention is particularly suitable for post-combustion catalysts, i.e., catalysts for the purification or the control of vehicular exhaust gas emissions from internal combustion engines. However, the support according to the invention may be used advantageously for catalysts employed in other fields as well.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A catalyst support comprising a metal substrate, a layer consisting essentially on said substrate of chromium electrolytically deposited and a layer of alumina deposited over said layer of chromium.

2. A catalyst support according to claim 1, wherein the metal substrate comprises a stainless and heat resistant steel.

3. A catalyst support according to claim 2, wherein said steel comprises a nickel-chromium based steel.

4. A catalyst support according to claim 3, wherein said steel has a content by weight of about 25% chromium and 13% nickel.

5. A catalyst support according to claim 1, wherein the chromium layer has an approximate thickness of about 1 micron.

6. A catalyst support according to claim 1, wherein the alumina layer has an approximate thickness of between about 10 to 30 microns.

7. A catalyst support according to claim 1, wherein the alumina is a fibrillar boehmite.

8. A catalyst support according to claim 1, wherein the substrate is in the monolithic form.

9. A catalyst support according to claim 8, wherein said support is in the form of a corrugated monolith wound in a helical manner.

10. A monolithic shaped article for the purification or control of vehicular exhaust gas emissions from internal combustion engines comprising the catalyst support according to claim 1.

11. A process for the preparation of a catalyst support comprising providing a metal substrate, electrolytically depositing a first layer consisting essentially of chromium on said substrate and depositing a second layer of alumina on said first layer of chromium.

12. A process according to claim 11, wherein the deposition of the alumina layer is effected by the atomization of the alumina onto a chromized and heated metal substrate.

13. A process according to claim 11, wherein the deposition of the alumina layer is effected by the immersion of said substrate in an aqueous dispersion of alumina.

14. A process according to claim 11, wherein prior to the deposition of the layer of alumina, monoaluminum phosphate $Al(H_2PO_4)_3$ is deposited on the chromized substrate, by immersion of the substrate therein.

15. A process according to claim 14, comprising the further step of calcining the substrate.

16. A process according to claim 15, wherein said calcination is carried out at about 600° C.

17. A process according to claim 13, wherein said aqueous dispersion of alumina is comprised of between about 5% to 15% by weight of alumina.

18. A process according to claim 17, wherein said aqueous dispersion further comprises between about 0.5% to 3% by weight of a surface active agent.

19. A process according to claim 11, wherein the deposited layer of alumina includes a co-deposited active catalyst for treatment of exhaust gases.

20. A catalyst support prepared by the process according to claim 11.

* * * * *